(12) United States Patent
Takahashi et al.

(10) Patent No.: US 11,888,326 B2
(45) Date of Patent: Jan. 30, 2024

(54) CONTACTLESS POWER SUPPLY DEVICE, CONTACTLESS POWER RECEPTION DEVICE, AND CONTACTLESS POWER SUPPLY SYSTEM

(71) Applicant: DENSO CORPORATION, Kariya (JP)

(72) Inventors: Masaya Takahashi, Kariya (JP); Yuusei Nakayashiki, Kariya (JP); Eisuke Takahashi, Kariya (JP); Masaki Kanesaki, Kariya (JP); Kazuhiro Uda, Kariya (JP); Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 17/503,953

(22) Filed: Oct. 18, 2021

(65) Prior Publication Data
US 2022/0037928 A1    Feb. 3, 2022

Related U.S. Application Data

(63) Continuation of application No. PCT/JP2020/016001, filed on Apr. 9, 2020.

(30) Foreign Application Priority Data

Apr. 16, 2019    (JP) .................................. 2019-077463

(51) Int. Cl.
*H02J 50/12*    (2016.01)
*H02J 50/90*    (2016.01)
(Continued)

(52) U.S. Cl.
CPC ............ *H02J 50/12* (2016.02); *B60L 53/122* (2019.02); *H02J 50/90* (2016.02); *H02M 1/12* (2013.01)

(58) Field of Classification Search
None
See application file for complete search history.

(56) References Cited

U.S. PATENT DOCUMENTS

| 2012/0242284 A1 | 9/2012 | Wheatley, III et al. |
| 2013/0062959 A1 | 3/2013 | Lee et al. |
| (Continued) | | |

FOREIGN PATENT DOCUMENTS

| JP | 2002-049428 A | 2/2002 |
| JP | 2016-195512 A | 11/2016 |
| (Continued) | | |

*Primary Examiner* — Daniel Kessie
(74) *Attorney, Agent, or Firm* — Oliff PLC

(57) ABSTRACT

A contactless power supply device that supplies electric power to a vehicle in a contactless manner, includes: a power transmission resonance circuit; a power source circuit supplying direct-current power; and a power transmission circuit converting the direct-current power of the power source circuit into alternating-current power and supplying alternating-current power to the power transmission resonance circuit. The power transmission circuit includes: an inverter circuit converting the direct-current power of the power source circuit into alternating-current power; and a power transmission-side immittance conversion circuit adjusting the alternating-current power of the inverter circuit and supplies the adjusted alternating-current power to the power transmission resonance circuit. The ratio of a characteristic impedance of the power transmission-side immittance conversion circuit to an impedance backward on the power transmission resonance circuit side from the power transmission-side immittance conversion circuit is adjusted such that harmonic components in the alternating-current power of the inverter circuit becomes lessened.

3 Claims, 6 Drawing Sheets

(51) Int. Cl.
    *B60L 53/122*     (2019.01)
    *H02M 1/12*     (2006.01)

(56) References Cited

U.S. PATENT DOCUMENTS

| | | |
|---|---|---|
| 2015/0380948 A1 | 12/2015 | Mazaki et al. |
| 2017/0373609 A1* | 12/2017 | Perreault ............... H02M 1/083 |
| 2018/0062430 A1* | 3/2018 | Matsumoto ....... H02M 3/33584 |

FOREIGN PATENT DOCUMENTS

| | | |
|---|---|---|
| JP | 2017-070062 A | 4/2017 |
| JP | 2018-007462 A | 1/2018 |

\* cited by examiner

CONTACTLESS POWER SUPPLY DEVICE, CONTACTLESS POWER RECEPTION DEVICE, AND CONTACTLESS POWER SUPPLY SYSTEM

CROSS-REFERENCE TO RELATED APPLICATION

This application is the U.S. bypass application of International Application No. PCT/JP2020/016001 filed on Apr. 9, 2020 which designated the U.S. and claims priority to Japanese Patent Application No. 2019-77463 filed on Apr. 16, 2019, the contents of both of which are incorporated herein by reference.

TECHNICAL FIELD

The present disclosure relates to a technology for supplying electric power to a vehicle in a contactless manner.

BACKGROUND

Japanese Patent No. 6344289 discloses a structure of a contactless power transmission system in which an immittance conversion circuit is interposed between the inverter of a power transmission device and a power transmission resonance circuit. In this structure, power transmission current is estimated based on the output voltage of the immittance conversion circuit. Accordingly, even if there occur changes in the relative positions of the power transmission coil of the power transmission resonance circuit and the power reception coil of the power reception resonance circuit mounted in a vehicle or fluctuations in the voltage of a load to which electric power is supplied from the power reception resonance circuit, it is possible to continue power supply while suppressing overcurrent.

SUMMARY

According to an aspect of the present disclosure, there is provided a contactless power supply device that supplies electric power to a vehicle in a contactless manner. The contactless power supply device includes: a power transmission resonance circuit; a power source circuit that supplies direct-current power; and a power transmission circuit that converts the direct-current power of the power source circuit into alternating-current power and supplies the alternating-current power to the power transmission resonance circuit. The power transmission circuit includes: an inverter circuit that converts the direct-current power of the power source circuit into alternating-current power; and a power transmission-side immittance conversion circuit that adjusts the alternating-current power of the inverter circuit and supplies the adjusted alternating-current power to the power transmission resonance circuit. A ratio of a characteristic impedance of the power transmission-side immittance conversion circuit to an impedance backward on the power transmission resonance circuit side from the power transmission-side immittance conversion circuit is adjusted such that harmonic components in the alternating-current power of the inverter circuit becomes lessened.

According to another aspect of the present disclosure, there is provided a contactless power reception device that receives electric power supplied to a vehicle in a contactless manner. The contactless power reception device includes: a power reception resonance circuit; and a power reception circuit that converts alternating-current power received by the power reception resonance circuit into direct-current power and supplies the direct-current power to a load. The power reception circuit includes: a power reception-side immittance conversion circuit that adjusts the alternating-current power input from the power reception resonance circuit; a rectification circuit that converts the alternating-current power input from the power reception-side immittance conversion circuit into direct-current power; and a power conversion circuit that converts the direct-current power input from the rectification circuit into power suppliable to the load. A ratio of a characteristic impedance of the power reception-side immittance conversion circuit to an impedance forward on the power reception resonance circuit side from the power reception-side immittance conversion circuit is adjusted such that harmonic components in the alternating-current power input into the rectification circuit becomes lessened.

According to yet another aspect of the present invention, there is provided a contactless power supply system that supplies electric power to a vehicle in a contactless manner, by using a plurality of power transmission resonance circuits arranged in a road and a power reception resonance circuit mounted in the vehicle. The contactless power supply system includes: a contactless power supply device that has the plurality of power transmission resonance circuits; and a contactless power reception device that is mounted in the vehicle. The contactless power supply device includes: the plurality of power transmission resonance circuits; a power source circuit that supplies direct-current power; and a plurality of power transmission circuits that converts the direct-current power of the power source circuit into alternating-current power and supplies the alternating-current power to the plurality of power transmission resonance circuits. The power transmission circuits include: an inverter circuit that converts the direct-current power of the power source circuit into alternating-current power; and a power transmission-side immittance conversion circuit that adjusts the alternating-current power of the inverter circuit and supplies the alternating-current power to the power transmission resonance circuits. A ratio of a characteristic impedance of the power transmission-side immittance conversion circuit to an impedance backward on the power transmission resonance circuit side from the power transmission-side immittance conversion circuit is adjusted such that harmonic components in the alternating-current power input into the rectification circuit becomes lessened. The contactless power reception device includes: the power reception resonance circuit; and a power reception circuit that converts the alternating-current power received by the power reception resonance circuit into direct-current power and supplies the direct-current power to a load. The power reception circuit includes: a power reception-side immittance conversion circuit that adjusts the alternating-current power input from the power reception resonance circuit; a rectification circuit that converts the alternating-current power input from the power reception-side immittance conversion circuit into direct-current power; and a power conversion circuit that converts the direct-current power input from the rectification circuit into power suppliable to the load. A ratio of a characteristic impedance of the power reception-side immittance conversion circuit to an impedance forward on the power reception resonance circuit side from the power reception-side immittance conversion circuit is adjusted such that harmonic components in the alternating-current power input into the rectification circuit becomes lessened.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
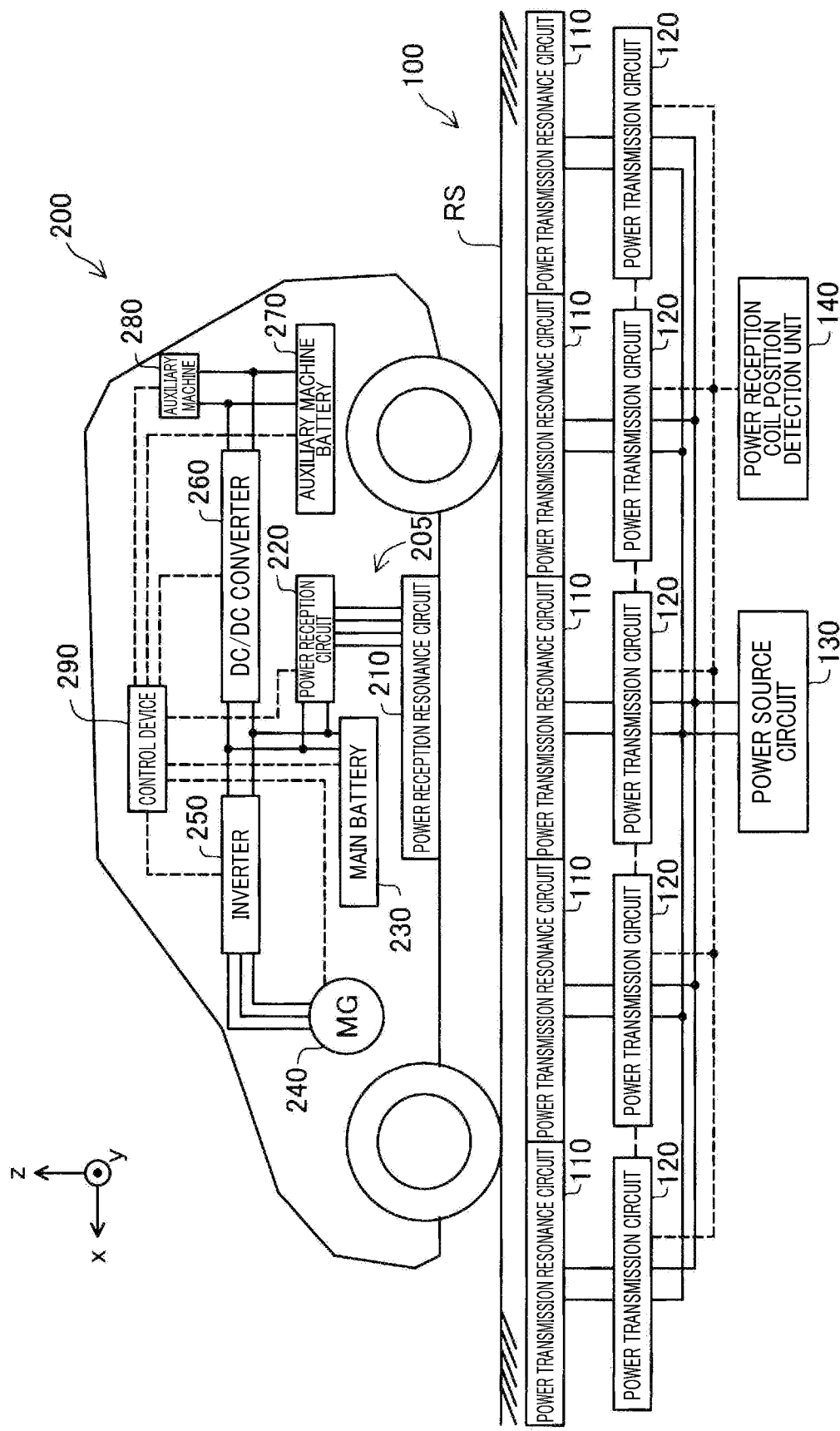
FIG. 1 is a block diagram illustrating an entire configuration of a contactless power supply system.

It has been found that the immittance conversion circuit provided in Japanese Patent No. 6344289 has a problem that, if the characteristic impedance of the immittance conversion circuit and the impedance on the power transmission resonance circuit side viewed from the immittance conversion circuit are ill-balanced, the harmonic components in the output current of the inverter increases and impairs the efficiency of power transmission.

According to an aspect of the present disclosure, there is provided a contactless power supply device that supplies electric power to a vehicle in a contactless manner. The contactless power supply device includes: a power transmission resonance circuit; a power source circuit that supplies direct-current power; and a power transmission circuit that converts the direct-current power of the power source circuit into alternating-current power and supplies the alternating-current power to the power transmission resonance circuit. The power transmission circuit includes: an inverter circuit that converts the direct-current power of the power source circuit into alternating-current power; and a power transmission-side immittance conversion circuit that adjusts the alternating-current power of the inverter circuit and supplies the adjusted alternating-current power to the power transmission resonance circuit. A ratio of a characteristic impedance of the power transmission-side immittance conversion circuit to an impedance backward on the power transmission resonance circuit side from the power transmission-side immittance conversion circuit is adjusted such that harmonic components in the alternating-current power of the inverter circuit becomes lessened.

According to the contactless power supply device, it is possible to lessen the harmonic components in the alternating-current power of the inverter circuit. This reduces a loss in the inverter circuit and improves the efficiency of power transmission to the vehicle.

According to another aspect of the present disclosure, there is provided a contactless power reception device that receives electric power supplied to a vehicle in a contactless manner. The contactless power reception device includes: a power reception resonance circuit; and a power reception circuit that converts alternating-current power received by the power reception resonance circuit into direct-current power and supplies the direct-current power to a load. The power reception circuit includes: a power reception-side immittance conversion circuit that adjusts the alternating-current power input from the power reception resonance circuit; a rectification circuit that converts the alternating-current power input from the power reception-side immittance conversion circuit into direct-current power; and a power conversion circuit that converts the direct-current power input from the rectification circuit into power suppliable to the load. A ratio of a characteristic impedance of the power reception-side immittance conversion circuit to an impedance forward on the power reception resonance circuit side from the power reception-side immittance conversion circuit is adjusted such that harmonic components in the alternating-current power input into the rectification circuit becomes lessened.

According to the contactless power reception device, it is possible to lessen the harmonic components in the alternating-current power input into the rectification circuit. Thus, it is possible to lessen the harmonic components in the alternating-current power of the inverter circuit included in the contactless power supply device that transmits power to the contactless power reception device, reduce a loss in the inverter circuit, and improve the efficiency of power transmission to the vehicle.

According to yet another aspect of the present invention, there is provided a contactless power supply system that supplies electric power to a vehicle in a contactless manner, by using a plurality of power transmission resonance circuits arranged in a road and a power reception resonance circuit mounted in the vehicle. The contactless power supply system includes: a contactless power supply device that has the plurality of power transmission resonance circuits; and a contactless power reception device that is mounted in the vehicle. The contactless power supply device includes: the plurality of power transmission resonance circuits; a power source circuit that supplies direct-current power; and a plurality of power transmission circuits that converts the direct-current power of the power source circuit into alternating-current power and supplies the alternating-current power to the plurality of power transmission resonance circuits. The power transmission circuits include: an inverter circuit that converts the direct-current power of the power source circuit into alternating-current power; and a power transmission-side immittance conversion circuit that adjusts the alternating-current power of the inverter circuit and supplies the alternating-current power to the power transmission resonance circuits. A ratio of a characteristic impedance of the power transmission-side immittance conversion circuit to an impedance backward on the power transmission resonance circuit side from the power transmission-side immittance conversion circuit is adjusted such that harmonic components in the alternating-current power input into the rectification circuit becomes lessened. The contactless power reception device includes: the power reception resonance circuit; and a power reception circuit that converts the alternating-current power received by the power reception resonance circuit into direct-current power and supplies the direct-current power to a load. The power reception circuit includes: a power reception-side immittance conversion circuit that adjusts the alternating-current power input from the power reception resonance circuit; a rectification circuit that converts the alternating-current power input from the power reception-side immittance conversion circuit into direct-current power; and a power conversion circuit that converts the direct-current power input from the rectification circuit into power suppliable to the load. A ratio of a characteristic impedance of the power reception-side immittance conversion circuit to an impedance forward on the power reception resonance circuit side from the power reception-side immittance conversion circuit is adjusted such that harmonic components in the alternating-current power input into the rectification circuit becomes lessened.

According to the contactless power supply system, the harmonic components in the alternating-current power of the inverter circuit can be lessened in the contactless power supply device. In addition, the harmonic components in the alternating-current power input into the rectification circuit can be lessened in the contactless power reception device. This lessens the harmonic components in the alternating-current power of the inverter circuit included in the contactless power supply device that transmits power to the contactless power reception device, and reduces a loss in the inverter circuit. Therefore, it is possible to improve the efficiency of power transmission from the contactless power transmission device to the vehicle equipped with the contactless power reception device.

A. First Embodiment

As illustrated in FIG. 1, a contactless power supply system includes a contactless power supply device 100 placed under a road RS, and a contactless power reception device 205 mounted in a vehicle 200 running on the road RS, and is capable of supplying electric power to the vehicle 200 during running. The vehicle 200 is formed, for example, as an electric automobile or a hybrid car. In FIG. 1, an x-axis direction indicates the traveling direction of the vehicle 200, a y-axis direction indicates a width direction of the vehicle 200, and a z-axis direction indicates a vertically upward direction. In the other diagrams described later, the x, y, and z-axis directions indicate the same directions as illustrated in FIG. 1.

The contactless power supply device 100 includes a plurality of power transmission resonance circuits 110, a plurality of power transmission circuits 120 that supplies alternating-current voltages to the plurality of power transmission resonance circuits 110, a power source circuit 130 that supplies direct-current voltages to the plurality of power transmission circuits 120, and a power reception coil position detection unit 140.

The plurality of power transmission resonance circuits 110 is placed in the road RS along the traveling direction of the vehicle 200 (also called "extending direction of the road RS"). The power transmission resonance circuits 110 include power transmission coils and resonance capacitors described later. Both the power transmission coils and the resonance capacitors of the power transmission resonance circuits 110 do not need to be placed along the extending direction of the road RS but at least a plurality of power transmission coils may be placed along the extending direction of the road RS.

The plurality of power transmission circuits 120 converts direct-current voltages supplied from the power source circuit 130 into high-frequency alternating-current voltages and applies the alternating-current voltages to the power transmission coils of the power transmission resonance circuits 110. A specific configuration example of the power transmission circuits 120 will be described later. The power source circuit 130 supplies direct-current voltages to the power transmission circuits 120. For example, the power source circuit 130 is formed as an AC/DC converter circuit that rectifies an alternating-current voltage of an external power source and outputs a resultant direct-current voltage.

The power reception coil position detection unit 140 detects the position of a power reception coil of a power reception resonance circuit 210 described later that is placed at the bottom part of the vehicle 200. The power reception coil position detection unit 140 may detect the position of the power reception coil of the power reception resonance circuit 210, for example, by the magnitude of transmission power or transmission current in the plurality of power transmission circuits 120, or may detect the position of the power reception coil of the power reception resonance circuit 210 by the use of wireless communication with the vehicle 200 or a position sensor that detects the position of the vehicle 200. The plurality of power transmission circuits 120 executes power transmission using one or more of the power transmission resonance circuits 110 close to the power reception resonance circuit 210, in accordance with the position of the power reception coil of the power reception resonance circuit 210 detected by the power reception coil position detection unit 140.

The vehicle 200 includes a contactless power reception device 205, a main battery 230, a motor generator 240, an inverter circuit 250, a DC/DC converter circuit 260, an auxiliary machine battery 270, an auxiliary machine 280, and a control device 290. The contactless power reception device 205 has the power reception resonance circuit 210 and a power reception circuit 220.

The power reception resonance circuit 210 includes a power reception coil and a resonance capacitor described later, and obtains alternating-current power induced into the power reception coil by the electromagnetic induction phenomenon between the power reception resonance circuit 210 and the power transmission resonance circuits 110. The power reception circuit 220 is a circuit that converts the alternating-current power output from the power reception resonance circuit 210 into direct-current power. A specific configuration example of the power reception circuit 220 will be described later. The direct-current power output from the power reception circuit 220 can be used for charging the main battery 230 as the load, and can also be used for charging the auxiliary machine battery 270, driving the motor generator 240, and driving the auxiliary machine 280.

The main battery 230 is a secondary battery that outputs a direct-current voltage for driving the motor generator 240. The motor generator 240 operates as a three-phase alternating motor and generates a driving force for running the vehicle 200. The motor generator 240 operates as the generator during deceleration of the vehicle 200 to generate a three-phase alternating-current voltage. When the motor generator 240 operates as the motor, the inverter circuit 250 converts the direct-current voltage of the main battery 230 into a three-phase alternating-current voltage to drive the motor generator 240. When the motor generator 240 operates as the generator, the inverter circuit 250 converts the three-phase alternating-current voltage output from the motor generator 240 into a direct-current voltage and supplies the direct-current voltage to the main battery 230.

The DC/DC converter circuit 260 converts the direct-current voltage of the main battery 230 into a lower direct-current voltage and supplies the lower direct-current voltage to the auxiliary machine battery 270 and the auxiliary machine 280. The auxiliary machine battery 270 is a secondary battery that outputs a direct-current voltage for driving the auxiliary machine 280. The auxiliary machine 280 is a peripheral device such as an air conditioner or a motor-driven power steering device.

The control device 290 controls the components of the vehicle 200. When receiving a contactless supply of power during running, the control device 290 controls the power reception circuit 220 to execute power reception.

Figure 2:
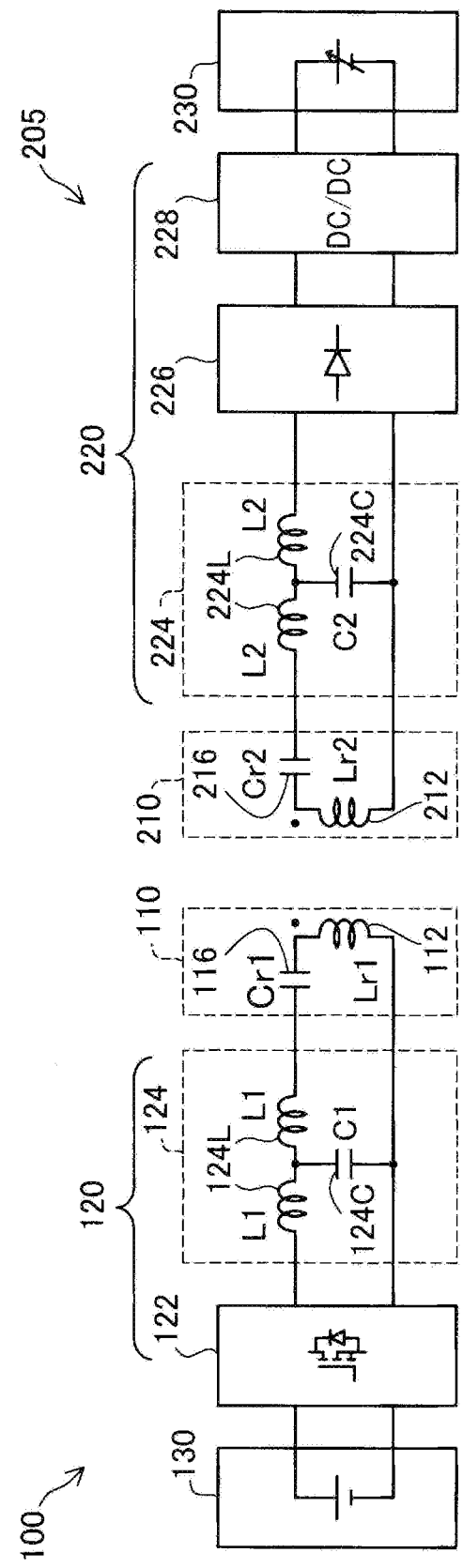
FIG. 2 is a block diagram illustrating a power transmission circuit in a contactless power supply device and a contactless power reception device during power supply.

One power transmission circuit 120 and one power transmission resonance circuit 110 of the contactless power supply device 100 and the power reception resonance circuit 210 and the power reception circuit 220 of the contactless power reception device 205 in the vehicle 200 are formed, for example, by circuits illustrated in FIG. 2.

The one power transmission resonance circuit 110 has a power transmission coil 112 and a resonance capacitor 116 connected in series. The power reception resonance circuit 210 has a power reception coil 212 and a resonance capacitor 216 connected in series. The magnetic resonance method based on a primary-series secondary-series capacitor scheme (also called "SS scheme") is applied to the power transmission resonance circuits 110 and the power reception resonance circuit 210. In addition, the monophase transmission side/monophase power reception side contactless power supply method is applied in which the power transmission side is formed by the monophase power transmission coil 112 and the power reception side is formed by the monophase power reception coil 212. Lr1 represents the inductance value of the power transmission coil 112, and Cr1 represents the capacitance value of the resonance capacitor 116. Lr2 represents the inductance value of the power reception coil 212, and Cr2 represents the capacitance value of the resonance capacitor 216.

The power transmission circuit 120 has an inverter circuit 122 that converts the direct-current power from the power source circuit 130 into alternating-current power, and an immittance conversion circuit 124 that is a T-LCL low-pass filter with two inductances 124L and one capacitor 124C. L1 represents the inductance values of the inductances 124L, and C1 represents the capacitance value of the capacitor 124C.

The power reception circuit 220 has an immittance conversion circuit 224 that is a T-LCL low-pass filter with two inductances 224L and one capacitor 224C, a rectification circuit 226 that converts alternating-current power into direct-current power, and a DC/DC converter circuit 228 that is a power conversion circuit converting direct-current voltage power so as to be suited for charging the main battery 230. L2 represents the inductance values of the inductances 224L, and C2 represents the capacitance value of the capacitor 224C.

In the following description, the inductances and capacitors included in the immittance conversion circuits 124 and 224 and the coils and capacitors included in the power transmission resonance circuits 110 and the power reception resonance circuit 210 may be represented with symbols indicating their respective values as reference signs, for the sake of convenience. For example, "inductances L1" may also represents the inductances 124L of the immittance conversion circuit 124 using their inductance values L1.

Figure 3:
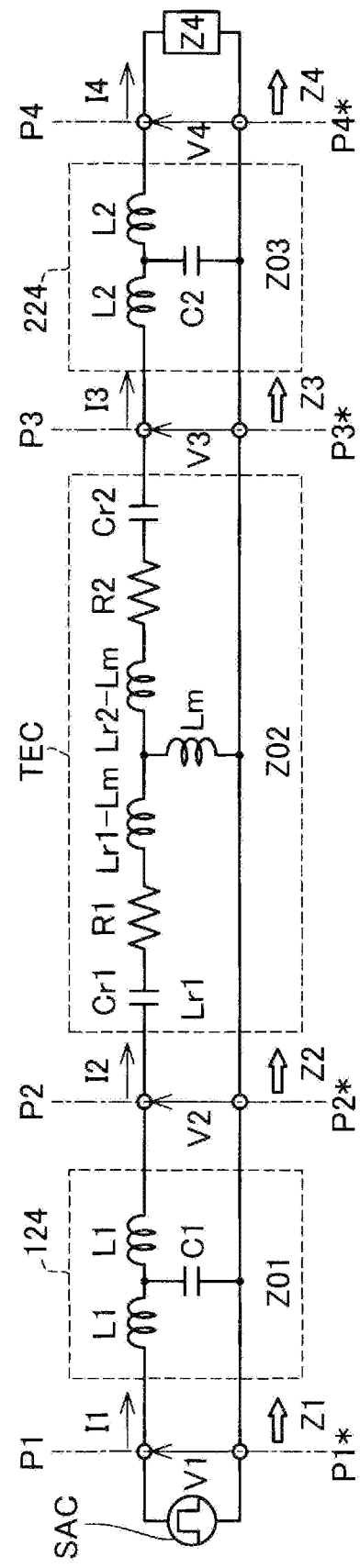
FIG. 3 is a descriptive diagram illustrating an equivalent circuit of FIG. 2.

The structure of the power source circuit 130 on the power supply side (also called "power transmission side") to the power reception circuit 220 on the power reception side illustrated in FIG. 2 can be represented by an equivalent circuit illustrated in FIG. 3. The power source circuit 130 and the inverter circuit 122 are replaced by an alternating-current power source SAC that outputs rectangular waves. The power transmission resonance circuit 110 and the power reception resonance circuit 210 are replaced by a T equivalent circuit TEC using a mutual inductance Lm between the power transmission coil Lr1 and the power reception coil Lr2. The reference signs R1 and R2 indicate wire-wound resistances. The rectification circuit 226 and the DC/DC converter circuit 228 are replaced by an impedance Z4 described later.

In the following description, the impedance on the input side of the immittance conversion circuit 124 viewed from an input terminal pair P1-P1* of the immittance conversion circuit 124 on the power transmission side is designated as Z1. The impedance Z1 is equal to V1/I1, where V1 denotes the voltage between the terminal pair P1-P1*, and I1 denotes the current flowing in the immittance conversion circuit 124. The characteristic impedance of the immittance conversion circuit 124 is designated as Z01. The impedance backward from an output terminal pair P2-P2* of the immittance conversion circuit 124 is designated as Z2. The impedance Z2 is equal to V2/I2, where V2 denotes the voltage between the terminal pair P2-P2*, and I2 denotes the current flowing backward. The impedance on the input side of the immittance conversion circuit 224 viewed from an input terminal pair P3-P3* of the immittance conversion circuit 224 on the power reception side is designated as Z3. The impedance Z3 is equal to V3/I3, where V3 denotes the voltage between the terminal pair P3-P3*, and I3 denotes the current flowing in the immittance conversion circuit 224. The characteristic impedance of the immittance conversion circuit 224 is designated as Z03. The impedance backward from an output terminal pair P4-P4* of the immittance conversion circuit 224 is designated as Z4. V4/I4 represents the impedance Z4, where V4 denotes the voltage between the terminal pair P4-P4*, and I4 denotes the current flowing backward. The impedance Z4 varies in accordance with the state of the main battery 230. The impedance Z4 is the largest when the main battery 230 is fully charged, and the impedance Z4 is the smallest when the main battery 230 is charged with the permitted largest current under the lowest voltage in the permitted usable range of voltages of the main battery 230.

Figure 4:
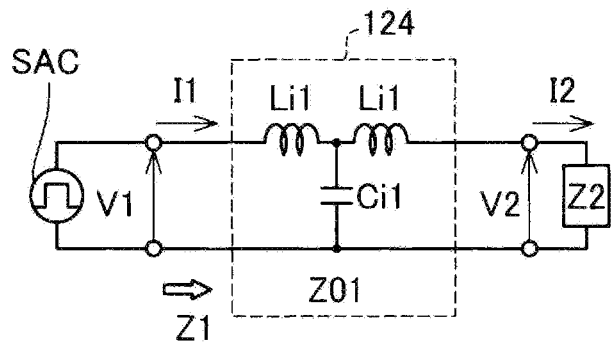
FIG. 4 is a descriptive diagram illustrating an equivalent circuit of FIG. 3 focused on an immittance conversion circuit on the power transmission side.

The immittance conversion circuit 124 on the power transmission side in FIG. 3 is represented by an equivalent circuit as illustrated in FIG. 4 in which rectangular alternating-current power of voltage V1 and current I1 is input from the alternating-current power source SAC and the impedance Z2 is connected to the output side (also called "backward") of the immittance conversion circuit 124. In the following description, the impedance Z2 will also be called "impedance backward Z2".

The impedance backward Z2 is expressed by the following equation (1):

$$Z2 = Z02^2/Z3 = (Z02^2/Z03^2) \cdot Z4 \quad (1)$$

where Z02 denotes the characteristic impedance of the T equivalent circuit TEC, and Z03 denotes the characteristic impedance of the immittance conversion circuit 124 on the power reception side. The characteristic impedance Z02 of the T equivalent circuit TEC is expressed by the following equation (2) using the angular frequency of the alternating-current power as ω0. The characteristic impedance Z03 of the immittance conversion circuit 124 on the power reception side is expressed by the following equation (3):

$$Z02 = \omega 0 \cdot Lm \quad (2)$$

$$Z03 = (L2/C2)^{1/2} \quad (3)$$

The impedance Z1 indicating the transfer function where the input current I1 is the input and the input voltage V1 is the output is expressed by the following equation (4) using the impedance backward Z2, the inductances L1 and capacitor C1 of the immittance conversion circuit 124, the angular frequency ω, and an imaginary number j:

$$Z1 = (1-\omega^2 \cdot L1 \cdot C1) \cdot Z2 + j\omega \cdot L1 \cdot (2-\omega^2 \cdot L1 \cdot C1)/((1-\omega^2 \cdot L1 \cdot C1) + j\omega \cdot C1 \cdot Z2) \quad (4)$$

The resonance condition of the impedance Z1 is that the imaginary number part of the above equation (4) becomes 0, which is expressed by the following equation (5):

$$L1 \cdot (2-\omega^2 \cdot L1 \cdot C1) - (1-\omega^2 \cdot L1 \cdot C1) - C1 \cdot Z2^2 \cdot (1-\omega^2 L1 \cdot C1) = 0 \quad (5)$$

The resonance angular frequencies satisfying the above equation (5) include a parallel resonance angular frequency $\omega 0\_1$ expressed by the following equation (6) and a series resonance angular frequency $\omega 0\_2$ expressed by the following equation (7):

$$\omega 0\_1 = 1/(L1 \cdot C1)^{1/2} \quad (6)$$

$$\omega 0\_2 = (2 - (C1/L) \cdot Z2^2)^{1/2}/(L1 \cdot C1)^{1/2} \quad (7)$$

The Q value is expressed by the following equation (8):

$$Q = (1 - Z2^2 \cdot (L1/C1))^{1/2} \cdot (L1/C1)^{1/2}/Z2 \quad (8)$$

As shown by the above equation (7), the series resonance angular frequency $\omega 0\_2$ shifts toward the higher frequency side where $\omega 0\_2 = (2/(L1 \cdot C1))^{1/2}$ as the impedance backward Z2 becomes smaller. Thus, the series resonance angular frequency $\omega 0\_2$ is separated from the parallel resonance angular frequency $\omega 0\_1 = 1/(L1 \cdot C1)^{1/2}$ (see the above equation (6)) that takes a constant value. The Q value becomes larger as the impedance backward Z2 becomes smaller as shown in the above equation (8). When $Z2^2 \cdot (L1/C1) \ll 1$, the Q value obtained from the above equation (8) corresponds to the Q value of the parallel resonance, which is expressed by the following equation (9):

$$Q = (L1/C1)^{1/2}/Z2 \quad (9)$$

As seen from the above equation (9), it is considered that the Q value of the parallel resonance is higher than the Q value in the above equation (8), which becomes more prominent as the impedance backward Z2 becomes smaller and the series resonance angular frequency $\omega 0\_2$ is more separated from the parallel resonance angular frequency $\omega 0\_1$.

Since each power transmission resonance circuits 110 and the power reception resonance circuit 210 (see FIG. 2) in the present embodiment use the series resonance as described above, the frequency of the alternating-current power output from the inverter circuit 122 is set in accordance with the frequency of the series resonance. Thus, as the impedance backward Z2 becomes smaller, the component of the basic frequency in the alternating-current power (current or voltage) input from the inverter circuit 122 into the immittance conversion circuit 124 is increasingly attenuated and the proportion of the harmonic components in the input alternating-current power becomes larger under the influence of the parallel resonance.

Using the characteristic impedance Z01 of the immittance conversion circuit 124 expressed by the following equation (10), the above equation (7) is expressed as in the following equation (11):

$$Z01 = (L1/C1)^{1/2} \quad (10)$$

$$\omega 0\_2 = (2 - Z2^2/Z01^2)^{1/2}/(L1 \cdot C1)^{1/2} \quad (11)$$

"The impedance backward Z2 becomes smaller" in the above equation (7) corresponds to "the characteristic impedance Z01 becomes equal to or greater than the impedance backward Z2" in the above equation (11). Thus, as shown in the following equation (12), setting the characteristic impedance Z01 to be equal to or smaller than the impedance backward Z2 makes it possible to reduce the influence of the parallel resonance and set the series resonance as the main resonance. This suppresses the proportion of the harmonic components in the alternating-current power output from the inverter circuit 122. The reduction of the harmonic components results in reduction of a switching loss in the inverter circuit 122 that would be caused by the alternating-current conversion. As a result, it is possible to improve the efficiency of power transmission in the entire contactless power supply system.

$$Z01/Z2 \leq 1 \quad (12)$$

In the equivalent circuit illustrated in FIG. 4, the input current I1 was simulated in the case where Z01>Z2 and in the case where Z01<Z2, where the alternating-current power source SAC outputs not a rectangular wave but a sine wave with the frequency f0=100 kHz and the input voltage V1=10V.

Figure 5:
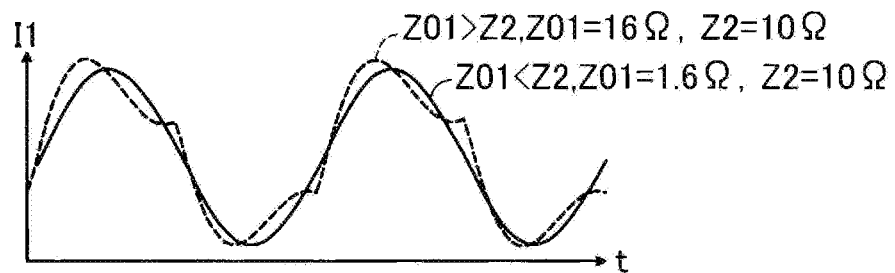
FIG. 5 is a descriptive diagram illustrating waveforms of input current into the immittance conversion circuit on the power transmission side.
Figure 6:
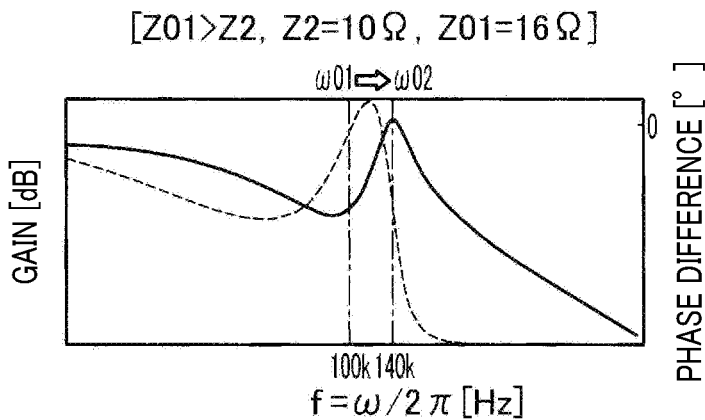
FIG. 6 is a descriptive diagram illustrating a first frequency characteristic of a transfer function of the immittance conversion circuit on the power transmission side.

In the case where Z01=16Ω, Z2=10Ω, and Z01>Z2, as illustrated in FIG. 6, it has been confirmed that, in the characteristics of gain (shown by a solid line) and phase difference (shown by a dotted line) of the transfer function of the input current I1 relative to the input voltage V1, the resonance frequency indicating the series resonance angular frequency $\omega 0\_2$ was as high as 140 kHz in comparison to the resonance frequency of 100 kHz indicating the parallel resonance angular frequency $\omega 0\_1$. In this case, as illustrated in FIG. 5, it has been found that the waveform of the input current I1 was increasingly distorted due to a higher proportion of the third-order harmonic component.

Figure 7:
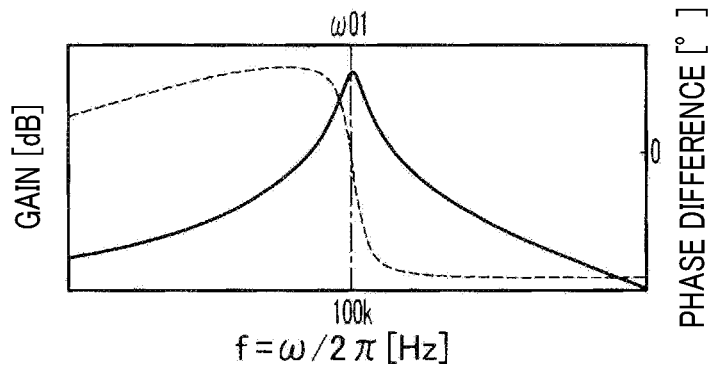
FIG. 7 is a descriptive diagram illustrating a second frequency characteristic of a transfer function of the immittance conversion circuit on the power transmission side.

In contrast to this, in the case where Z01=1.6Ω, Z2=10Ω, and Z01<Z2, as illustrated in FIG. 7, it has been confirmed that, in the characteristics of gain (shown by a solid line) and phase difference (shown by a dotted line) of the transfer function of the input current I1 relative to the input voltage V1, the series resonance angular frequency $\omega 0\_2$ is almost 100 kHz, which is the same as the resonance frequency of 100 kHz indicating the parallel resonance angular frequency $\omega 0\_1$. In this case, as illustrated in FIG. 5, it has been found that the waveform of the input current I1 was less distorted due to a smaller proportion of the third-order harmonic component.

From the above, setting the characteristic impedance Z01 to be equal to or smaller than the impedance backward Z2 so as to satisfy the above equation (12) suppresses the proportion of the harmonic components in the alternating-current power output from the inverter circuit 122 and reduces a switching loss in the inverter circuit 122. As a result, it is possible to improve the efficiency of power transmission in the entire contactless power supply system.

Figure 8:
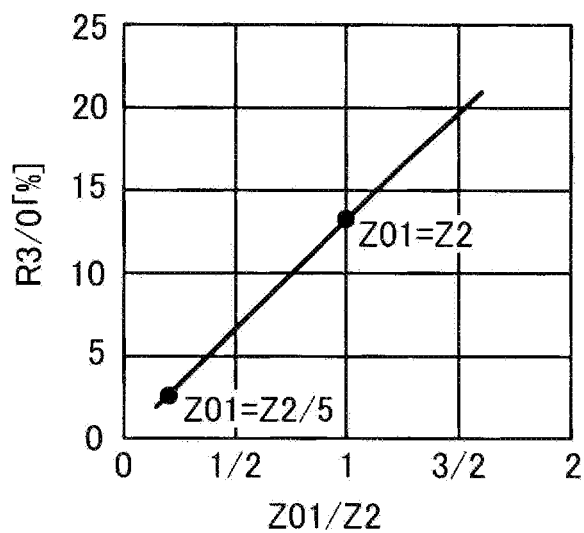
FIG. 8 is a descriptive diagram illustrating the relationship between a characteristic impedance of the immittance conversion circuit on the power transmission side and a third-order harmonic component.

FIG. 8 illustrates a relationship between the magnitude Z01/Z2 of the characteristic impedance Z01 relative to the impedance backward Z2 and the ratio R3/0% of the third-order harmonic component to the basic wave component. It has been found from this relationship that setting the characteristic impedance Z01 to be ⅕ or less of the impedance backward Z2 would reduce the proportion of the third-order harmonic component to 3% or less.

Thus, in the contactless power supply device 100 of the present embodiment, the immittance conversion circuits 124 in the power transmission circuits 120 adjust their own characteristic impedances Z01 to be equal to or less than their own impedances backward Z2. This allows the power transmission circuits 120 to reduce the harmonic components in the alternating-current power output from the inverter circuits 122 and improve the efficiency of power transmission. In particular, adjusting their own characteristic impedances Z01 to be ⅕ or less of their own impedances backward Z2 allows the ratios of the third-order harmonic components to the basic wave components to be reduced to 3% or less. This more effectively suppresses the proportions of the harmonic components in the alternating-current power output from the inverter circuits 122 and reduce switching losses in the inverter circuits 122. As a result, it is possible to improve the efficiency of power transmission more effectively in the entire contactless power supply system.

When a coupling coefficient k represented by the following equation (13) is minimized, the alternating-current inverter current output from the inverter circuit 122 becomes maximized and the harmonic components included in the inverter alternating current also becomes maximized:

$$k = Lm/(Lr1 \cdot Lr2)^{1/2} \tag{13}$$

Thus, it is preferable to adjust the characteristic impedance Z01 with respect to the impedance backward Z2 on the condition under which the coupling coefficient k becomes the smallest, that is, the condition under which the harmonic components included in the inverter current becomes the largest. The condition under which the coupling coefficient k becomes the smallest is that the position of the center of the power reception coil Lr2 is at the maximum height permitted in the height direction (the z direction in FIG. 1) with respect to the position of the center of the power transmission coil Lr1 and is at a position with the maximum shift in the permitted range of shifts in the horizontal direction (the y direction in FIG. 1). By adjusting the characteristic impedance Z01 with respect to the impedance backward Z2 on this condition, it is possible to reduce the harmonic components under the most severe condition of harmonic occurrence. The height of the power reception coil Lr2 is a parameter depending on the vehicle because the power reception coil Lr2 is generally placed on the bottom surface of the vehicle.

B. Second Embodiment

For the immittance conversion circuit 224 on the power reception side provided in the power reception circuit 220 of the contactless power reception device 205 illustrated in FIG. 2, the rectifying operation by the rectification circuit 226 can be treated as an operation of applying alternating-current power of rectangular wave to the immittance conversion circuit 224. Thus, an immittance conversion circuit 224 on the power reception side illustrated in FIG. 9 is represented by an equivalent circuit in which an alternating-current power source SAC is connected to the output side, that is, backward (the input side in this example) of the immittance conversion circuit 224, and an impedance Z3* is connected to the input side, that is, forward (the output side in this example) of the immittance conversion circuit 224.

Figure 10:
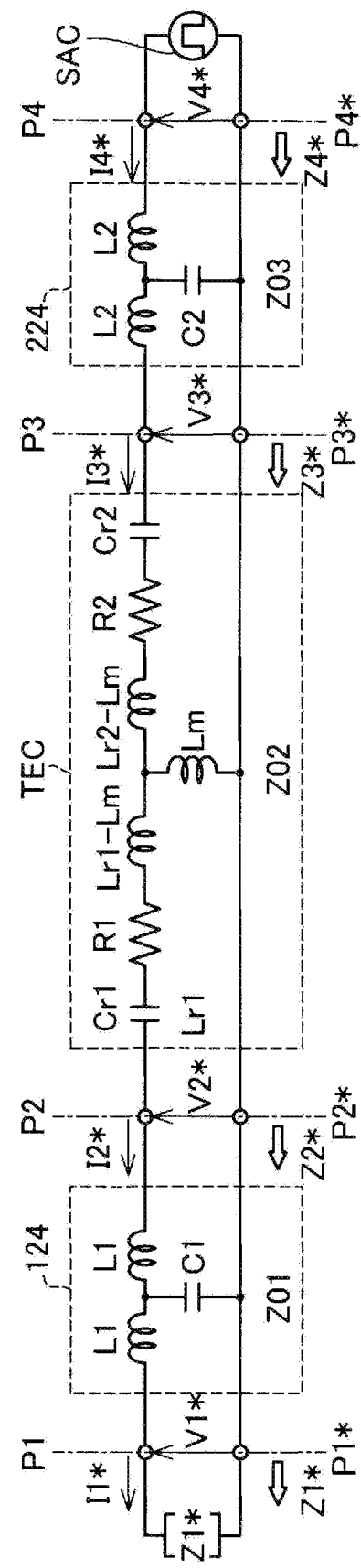
FIG. 10 is a descriptive diagram illustrating an equivalent circuit of FIG. 9 corresponding to an impedance forward.

The impedance Z3* is an impedance forward from an input terminal pair P3-P3* of the immittance conversion circuit 224 in the equivalent circuit illustrated in FIG. 10 similar to that in FIG. 3. In the following description, the impedance Z3* will also be called "impedance forward Z3*".

Figure 9:
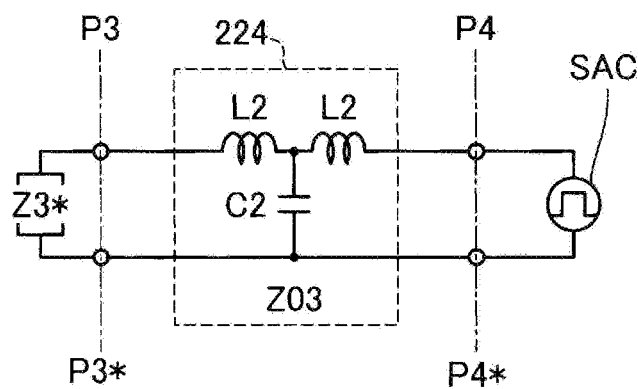
FIG. 9 is a descriptive diagram illustrating an equivalent circuit of FIG. 3 focusing on an immittance conversion circuit on the power reception side.

The immittance conversion circuit 224 on the power reception side represented by the equivalent circuit of FIG. 9 is considered to be similar to the immittance conversion circuit 124 on the power transmission side represented by the equivalent circuit of FIG. 4. That is, setting the characteristic impedance Z03 of the immittance conversion circuit 224 on the power reception side to be equal to or less than the impedance forward Z3* makes it possible to reduce the influence of the parallel resonance and set the series resonance as the main resonance, as shown in the following equation (14):

$$Z03/Z3^* \leq 1 \tag{14}$$

This suppresses the proportion of the harmonic components in the alternating-current power input into the rectification circuit 226, and thus suppresses the proportion of the harmonic components in the alternating-current power output from the inverter circuit 122 of the contactless power supply device 100. As a result, it is possible to reduce a switching loss in the inverter circuit 122 and improve the efficiency of power transmission in the entire contactless power supply system. In addition, setting the characteristic impedance Z03 to be ⅕ or less of the impedance forward Z3 makes it possible to reduce the proportion of the third-order harmonic component to 3% or less, thereby more effectively improving the efficiency of power transmission in the entire contactless power supply system.

The impedance forward Z3* is expressed by the following equation (15):

$$Z3^* = Z02^2/Z2^* = (Z02^2/Z01^2) \cdot Z1^* \tag{15}$$

where Z02 denotes the characteristic impedance of the T equivalent circuit TEC, which is expressed by the above equation (2); Z01 denotes the characteristic impedance of the immittance conversion circuit 124 on the power transmission side, which is expressed by the above equation (10); Z2* denotes the impedance forward from the output terminal pair P2-P2* of the immittance conversion circuit 124 on the power reception side as illustrated in FIG. 10, and the impedance Z2* is equal to V2*/I2*, where V2* denotes the voltage between the terminal pair P2-P2* and I2* denotes the current flowing to forward; Z1* denotes the impedance forward from the input terminal pair P1-P1* of the immittance conversion circuit 124 on the power reception side as illustrated in 10, and the impedance Z1* is equal to V1*/I1*, where V1* denotes the voltage between the terminal pair P1-P1* and I1* denotes the current flowing to forward.

When the coupling coefficient k represented by the above equation (13) becomes the largest, the alternating rectification current flowing into the rectification circuit 226 becomes the largest and the harmonic components included in the alternating rectification current also becomes the largest. Thus, it is preferable to adjust the characteristic impedance Z03 with respect to the impedance forward Z3* on the condition under which the coupling coefficient k becomes the largest, that is, on the condition under which the harmonic components included in the rectification current becomes the largest. The condition under which the coupling coefficient k becomes the largest is that the position of the center of the power reception coil Lr2 is at the minimum height permitted in the height direction (the z direction in FIG. 1) with respect to the position of the center of the power transmission coil Lr1 and is at a position with the minimum shift in the permitted range of shifts in the horizontal direction (the y direction in FIG. 1). By adjusting the characteristic impedance Z03 with respect to the impedance forward Z3* on this condition, it is possible to reduce the harmonic components under the most severe condition of harmonic occurrence.

C. Third Embodiment

In the first embodiment, the characteristic impedance Z01 of the immittance conversion circuit 124 provided in the power transmission circuits 120 of the contactless power supply device 100 is adjusted with respect to the impedance backward Z2. In the second embodiment, the characteristic impedance Z03 of the immittance conversion circuit 224 provided in the power reception circuit 220 of the contactless power reception device 205 mounted in the vehicle 200 is adjusted with respect to the impedance forward Z3*. As described above in relation to the embodiments, the characteristic impedance of the immittance conversion circuit of either the contactless power supply device or the contactless power reception device may be adjusted as described above or the characteristic impedances of the both immittance conversion circuits may be adjusted as described above. In the configuration in which the characteristic impedances of the both immittance conversion circuits are adjusted as described above, it is possible to further improve more effectively the efficiency of power supply from the contactless power supply device 100 to the contactless power reception device 205 in the vehicle 200.

D. Other Embodiments (1) In the above-described embodiments, the power transmission coil 112 on the power transmission side and the power reception coil 212 on the power reception side are both monophase. However, the present disclosure is not limited to this configuration. The power transmission coil on the power transmission side may be multiphase. Alternatively, the power reception coil on the power reception side may be multiphase. For example, the conductive coil on the power transmission side may be monophase and the power reception coil on the power reception side may have two or three or more phases. Alternatively, the power transmission coil on the power transmission side may have two or three or more phases, and the power reception coil on the power reception side may be monophase or multiphase. In the configuration in which the power transmission coil or the power reception coil is multiphase, it is preferable to provide immittance conversion circuits in correspondence with the individual phases and adjust the characteristic impedances of these immittance conversion circuits as described above in relation to the embodiments.

(2) In the above embodiments, as an example, the contactless power supply device 100 placed in the road RS includes the plurality of power transmission resonance circuits 110 and the plurality of power transmission circuits 120 corresponding to the plurality of power transmission resonance circuits 110. However, the present disclosure is not limited to this configuration but may be a contactless power supply device including one power transmission resonance circuit 110 and one power transmission circuit 120 corresponding to the one power transmission resonance circuit 110. In this case, for example, bringing the vehicle 200 to a halt such that the power reception coil 212 faces the one power transmission coil 112 allows the vehicle 200 to be supplied with electric power.

(3) In the above embodiments, the T-LCL immittance conversion circuit is taken as an example. Alternatively, a T-CLC immittance conversion circuit may be provided instead. In this case, it is preferable to adjust the characteristic impedance corresponding to the T-CLC immittance conversion circuit as described above in relation to the embodiments.

The present disclosure is not limited to the embodiments described above but can be realized in various configurations without departing from the gist of the present disclosure. For example, the technical features in the aspects described in the Summary of the Invention can be replaced or combined with each other as appropriate to solve some or all of the foregoing issues or to attain some or all of the above advantageous effects. In addition, the technical features can be deleted as appropriate unless they are described as essential herein.

What is claimed is:

1. A contactless power supply device that supplies electric power to a vehicle in a contactless manner, the power supply device comprising:
a power transmission resonance circuit;
a power source circuit that supplies direct-current power; and
a power transmission circuit that converts the direct-current power of the power source circuit into alternating-current power and supplies the alternating-current power to the power transmission resonance circuit, wherein
the power transmission circuit includes:
an inverter circuit that converts the direct-current power of the power source circuit into alternating-current power; and
a power transmission-side immittance conversion circuit that adjusts the alternating-current power of the inverter circuit and supplies the adjusted alternating-current power to the power transmission resonance circuit, and
a characteristic impedance of the power transmission-side immittance conversion circuit is $\frac{1}{5}$ or less of an impedance backward on the power transmission resonance circuit-side from the power transmission-side immittance conversion circuit.

2. A contactless power reception device that receives electric power supplied to a vehicle in a contactless manner, the power reception device comprising:
a power reception resonance circuit; and
a power reception circuit that converts alternating-current power received by the power reception resonance circuit into direct-current power and supplies the direct-current power to a load, wherein
the power reception circuit includes:
a power reception-side immittance conversion circuit that adjusts the alternating-current power input from the power reception resonance circuit;
a rectification circuit that converts the alternating-current power input from the power reception-side immittance conversion circuit into direct-current power; and
a power conversion circuit that converts the direct-current power input from the rectification circuit into power suppliable to the load, and
a characteristic impedance of the power reception-side immittance conversion circuit is $\frac{1}{5}$ or less of an impedance forward on the power reception resonance circuit-side from the power reception-side immittance conversion circuit.

3. A contactless power supply system that, by using a plurality of power transmission resonance circuits arranged in a road and a power reception resonance circuit mounted in a vehicle, supplies electric power to the vehicle in a contactless manner, the contactless power supply system comprising:
- a contactless power supply device that has the plurality of power transmission resonance circuits; and
- a contactless power reception device that is mounted in the vehicle, wherein:
- the contactless power supply device includes:
  - the plurality of power transmission resonance circuits;
  - a power source circuit that supplies direct-current power; and
  - a plurality of power transmission circuits that convert the direct-current power of the power source circuit into alternating-current power and supply the alternating-current power to the plurality of power transmission resonance circuits;
- the power transmission circuits each include:
  - an inverter circuit that converts the direct-current power of the power source circuit into alternating-current power; and
  - a power transmission-side immittance conversion circuit that adjusts the alternating-current power of the inverter circuit and supplies the alternating-current power to the power transmission resonance circuits,
  - a characteristic impedance of the power transmission-side immittance conversion circuit being $1/5$ or less of an impedance backward on the power transmission resonance circuit-side from the power transmission-side immittance conversion circuit;
- the contactless power reception device includes:
  - the power reception resonance circuit; and
  - a power reception circuit that converts the alternating-current power received by the power reception resonance circuit into direct-current power and supplies the direct-current power to a load; and
- the power reception circuit includes:
  - a power reception-side immittance conversion circuit that adjusts the alternating-current power input from the power reception resonance circuit;
  - a rectification circuit that converts the alternating-current power input from the power reception-side immittance conversion circuit into direct-current power; and
  - a power conversion circuit that converts the direct-current power input from the rectification circuit into power suppliable to the load,
  - a characteristic impedance of the power reception-side immittance conversion circuit being $1/5$ or less of an impedance forward on the power reception resonance circuit-side from the power reception-side immittance conversion circuit.

\* \* \* \* \*